E. W. HITCHCOCK.
PASTRY BOARD.
APPLICATION FILED FEB. 24, 1917.
1,251,026.
Patented Dec. 25, 1917.
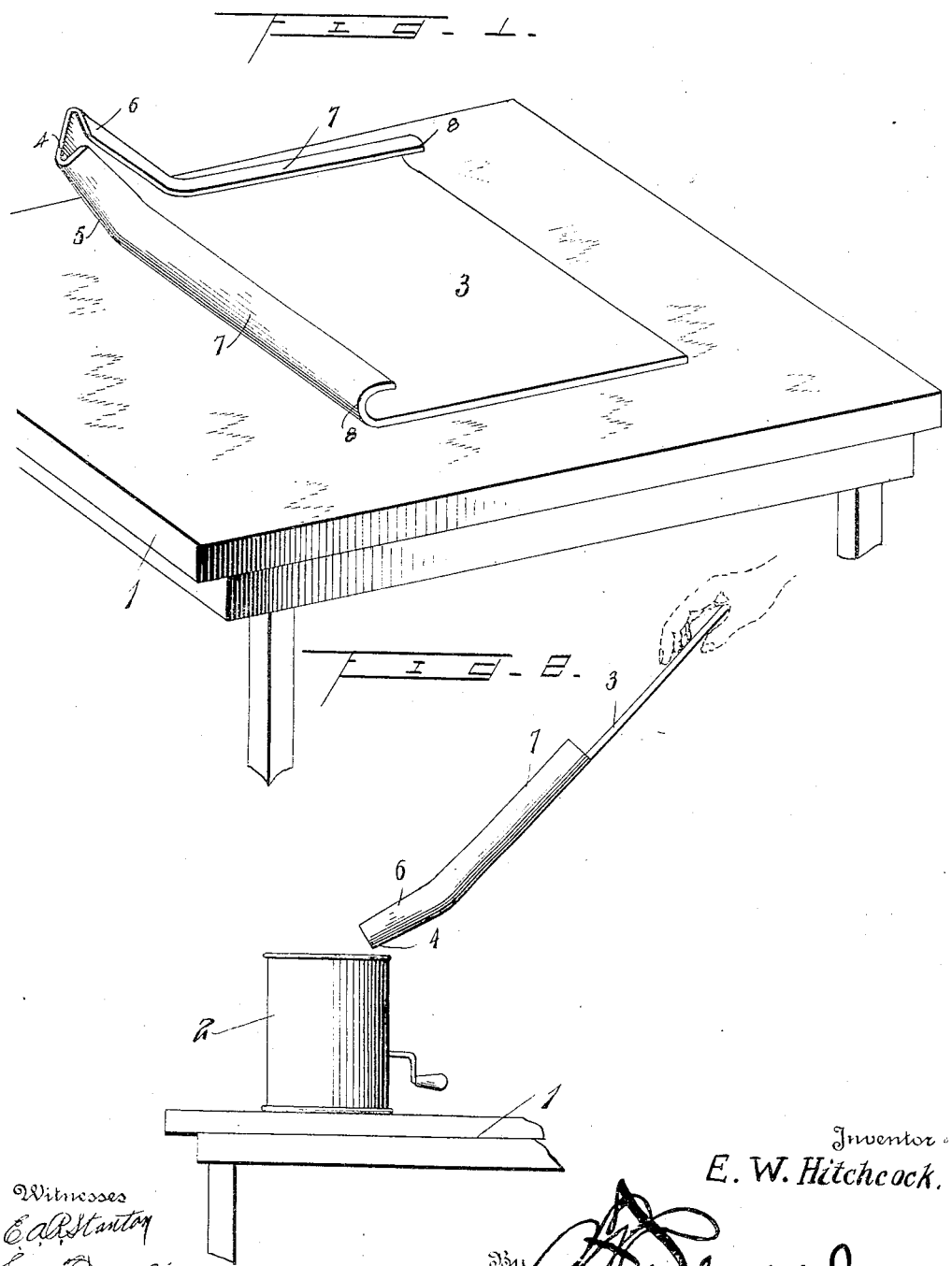

UNITED STATES PATENT OFFICE.

EDWARD W. HITCHCOCK, OF WALDEN, COLORADO.

PASTRY-BOARD.

1,251,026.  Specification of Letters Patent.  Patented Dec. 25, 1917.

Application filed February 24, 1917. Serial No. 150,691.

*To all whom it may concern:*

Be it known that I, EDWARD W. HITCHCOCK, a citizen of the United States, residing at Walden, in the county of Jackson and State of Colorado, have invented certain new and useful Improvements in Pastry-Boards; and I do hereby declare the following to be a full, clear, and exact description of the invention, such as will enable others skilled in the art to which it appertains to make and use the same.

This invention relates to improvements in pastry boards.

The object of this invention is the provision of a board constructed of suitable material such as wood, metal or the like and it is provided on certain of its side edges with flanges, which are connected with a spout which permits flour to be sifted on the boards and returned to the sifter to be resifted so as to cause a finer sifting of the flour and increase the quality thereof and also enabling the use of cheaper flour if so desired and to thoroughly mix the raising powders, as well as other ingredients until the true temper is obtained.

A further object of this invention is to provide a pastry board of this character, which is so constructed that the flour may be sifted thereon and returned to the sifter without fear of the same being spilled on the floor which would be the case if the spout and flanges were not provided.

A still further object of this invention is the provision of a pastry board of this character, which will be simple, practical, and comparatively inexpensive in construction, and one that can be manufactured and sold at a low cost.

With these and other objects in view, the invention consists of certain novel features of construction, as will be hereinafter more fully described and claimed.

In the drawing:

Figure 1 is a perspective view illustrating my improved pastry board as made in accordance with this invention, Fig. 2 is a side elevation illustrating the manner in which the board is inverted to return the flour back into the sifter.

Like numerals of reference designate corresponding parts in all the figures of the drawings.

Referring more particularly to the drawing, the numeral 1 designates a table and the numeral 2 a flour sifter of any well known type, which is placed upon the table and which is used in combination with my improved board.

My improved board comprises, in its construction, a flat substantially rectangular body 3, it being understood that any other desired configuration may be resorted to. The body 2 is provided at one corner with a reduced outwardly extending extension 4, which is curved upwardly out of the plane of the body, as at 5, and has its adjacent side edges turned upwardly and inwardly, as at 6, to constitute retaining flanges. The adjacent side edges of the body 3 are also curved upwardly and inwardly, as at 7, to provide retaining flanges for preventing the contents of the body 3 passing through the spout from spilling off of the body and spout prior to its entrance into a sifter designated 2 and illustrated in Fig. 2 of the drawing.

The side flanges 7 are curved upwardly and inwardly as at 8 and thus prevent the contents when sifted upon the upper surface of the body 3 from being spilled therefrom during its inverted action for the replacing of the material from the body 3 into the sifter 2.

The spout 4 is curved upwardly as at 5 and at an angle of about 30 degrees, thus positioning the same out of the plane of the body 3, so that the contents of the body 3 may be readily replaced back into the sifter when desired as shown in Fig. 2.

The body 3, spout and flanges are all formed of a single piece of material, such as metal, wood or the like and it being understood that the same can be constructed in any desired configuration without departing from the spirit and scope of the claims.

In operation, the body 3 is placed upon the table as illustrated in Fig. 1, the flour is then placed in the sifter 2 and sifted upon the upper surface of the body 3 and the board is grasped at one end remote from the spout and inturned side flanges and is inverted as shown in Fig. 2, thus permitting the contents on the upper surface of the board to pass over the surface of the board and out through the spout and back into the sifter, thus permitting the contents to be sifted to make a finer baking material as well as also providing a means for thoroughly mixing the raising powders giving the entire mixture a true temper, or in other words, permitting the ingredients to be thoroughly mixed until the true temper is obtained.

What is claimed is:

1. A pastry board comprising a flat body, a tapered extension in one corner of the body, the adjacent side edges of the extension and body extending upwardly and inwardly to constitute retaining flanges, as and for the purpose specified.

2. A pastry board comprising a flat substantially rectangular shaped body, an extension at one corner of the body constituting a spout, the adjacent side edges of the extension and body being curved upwardly and inwardly to constitute retaining flanges, as and for the purpose specified.

3. A pastry board comprising a flat rectangular body, one corner of the body being extended to constitute a spout, the adjacent side edges of the spout and body being curved upwardly and inwardly to define retaining flanges, said flanges preventing the contents of the body from being spilled when the body is inverted to pour the contents through the spout, as and for the purpose specified.

4. A pastry board comprising a substantially flat rectangular body, tapered extensions formed on one corner of the body and curved upwardly therefrom constituting a spout, the adjacent edges of the body and spout being curved upwardly and inwardly forming retaining flanges to prevent the contents of the body from passing off of the spout during its passage from the body.

5. A pastry board comprising a flat rectangular body, an extension formed on one corner of the body and bent upwardly out of the plane of the body and constituting a spout, the adjacent side edges of the body and spout being bent upwardly and inwardly, defining retaining flanges to prevent the contents of the body from being spilled during its passage from and over the spout into the receptacle, as and for the purpose specified.

In testimony whereof I affix my signature in presence of two witnesses.

EDWARD W. HITCHCOCK.

Witnesses:
MALCOLM L. HILL,
LEMUEL E. McINDOO.

Copies of this patent may be obtained for five cents each, by addressing the "Commissioner of Patents, Washington, D. C."